Jan. 7, 1958
A. E. LE VAN ET AL
2,818,876
INSTRUMENTS
Filed Jan. 19, 1954
5 Sheets-Sheet 1
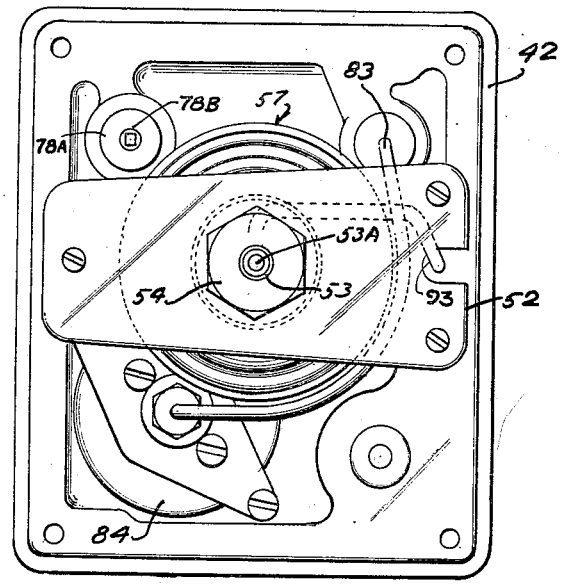
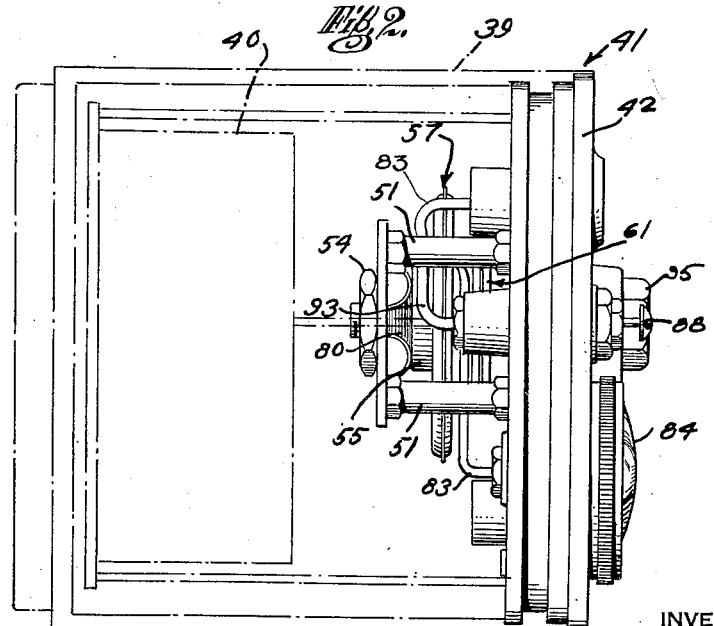
INVENTORS
*AMBROSE E. LeVAN*
*WILLIAM D. HUSTON*
BY
*Pollard, Johnston, Smythe & Robertson*
ATTORNEYS Jan. 7, 1958 A. E. LE VAN ET AL 2,818,876
INSTRUMENTS
Filed Jan. 19, 1954 5 Sheets-Sheet 2
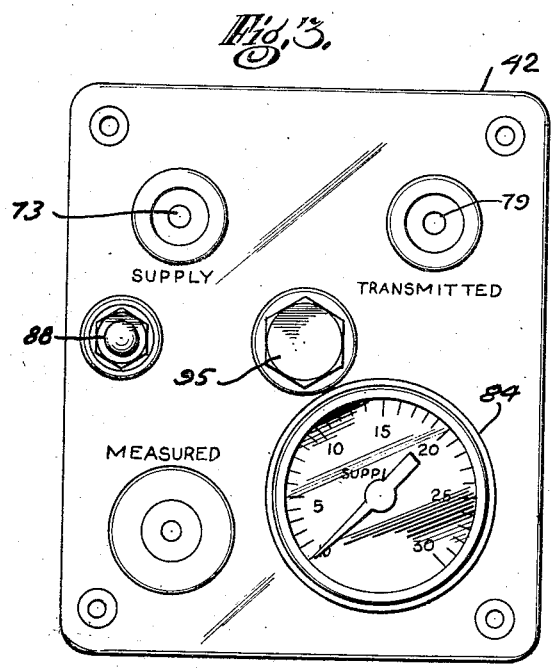
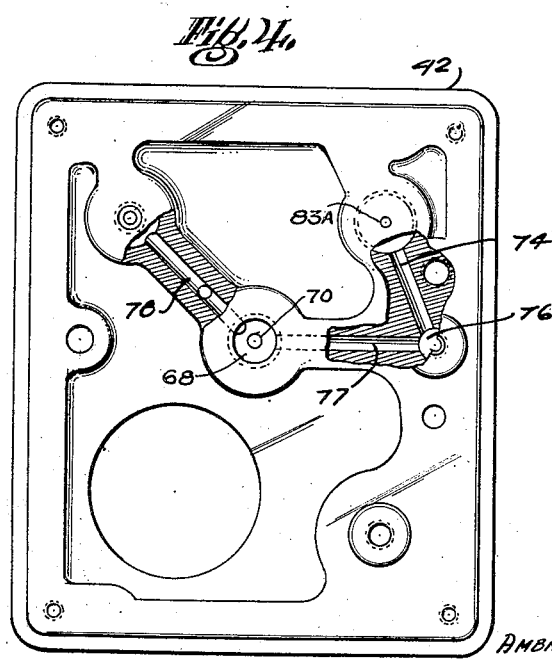
INVENTORS
AMBROSE E. LEVAN
WILLIAM D. HUSTON
BY
Pollard, Johnston, Smythe & Robertson
ATTORNEYS Jan. 7, 1958   A. E. LE VAN ET AL   2,818,876
INSTRUMENTS
Filed Jan. 19, 1954   5 Sheets-Sheet 3
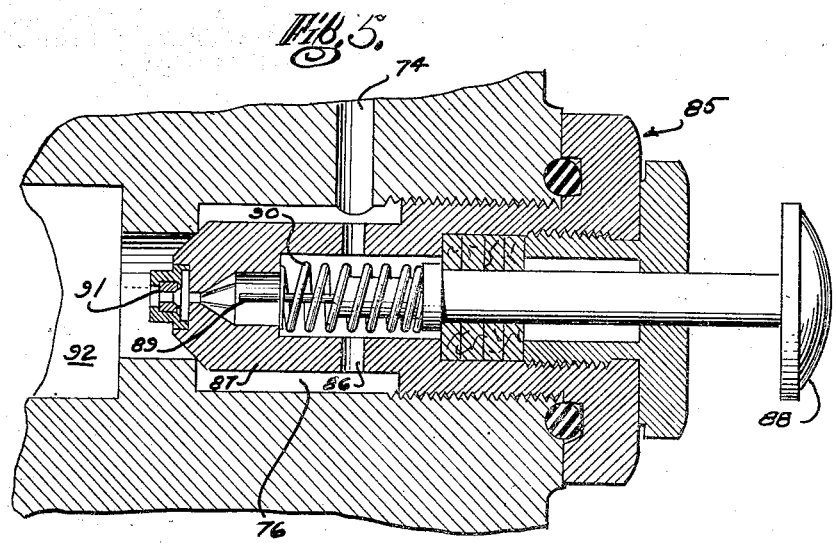
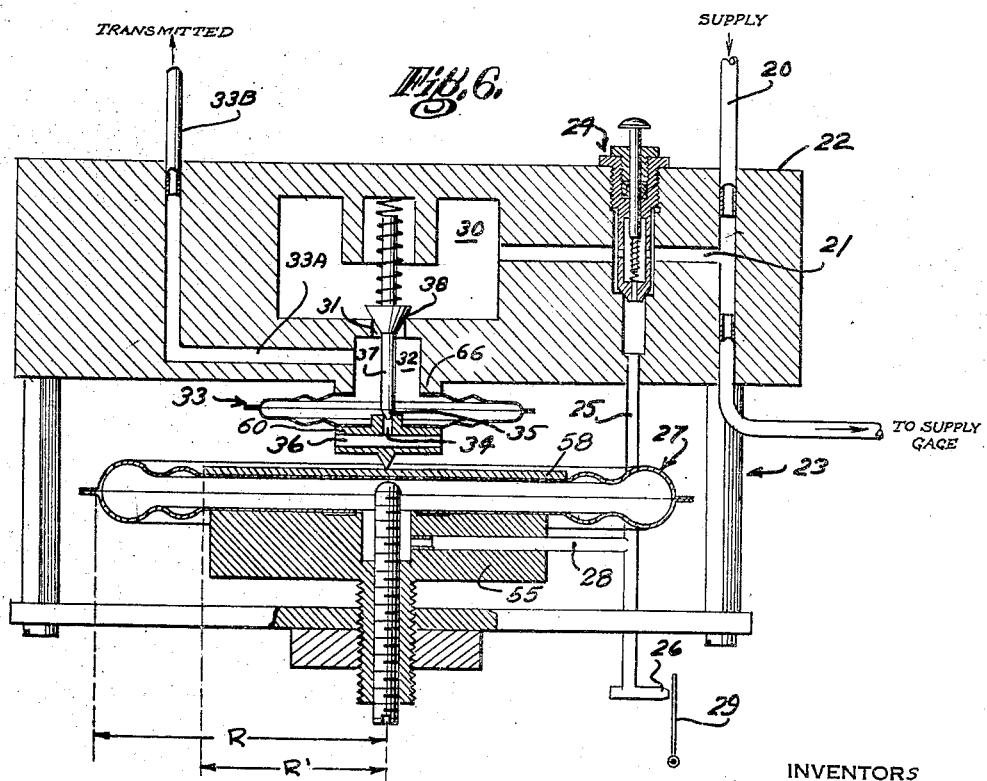
$$\frac{A'}{A} = \frac{\pi(R')^2}{\pi(R)^2} = 18\text{-}62\%$$
% TITANIUM IN DIAPHRAGMS = 2.2-2.6%
INVENTORS
AMBROSE E. LeVAN
BY WILLIAM D. HUSTON
Pollard, Johnston, Smythe & Robertson
ATTORNEYS

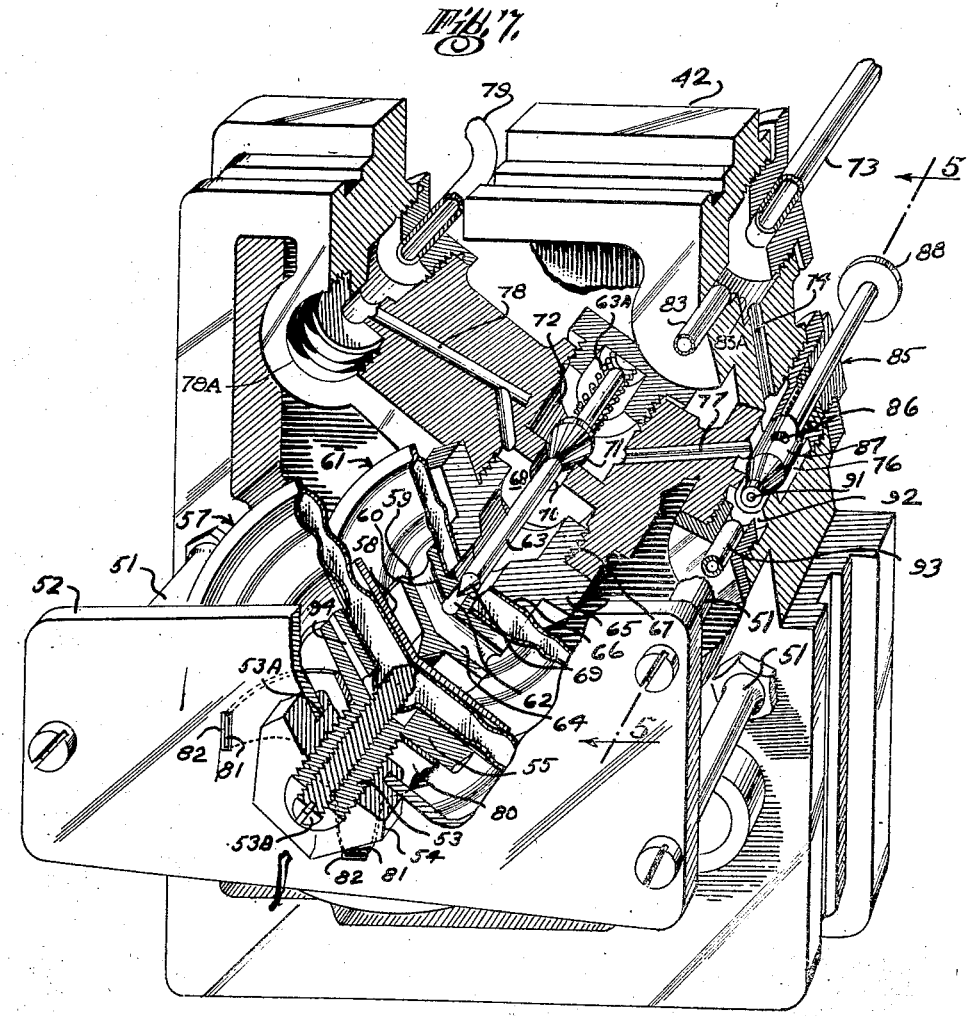

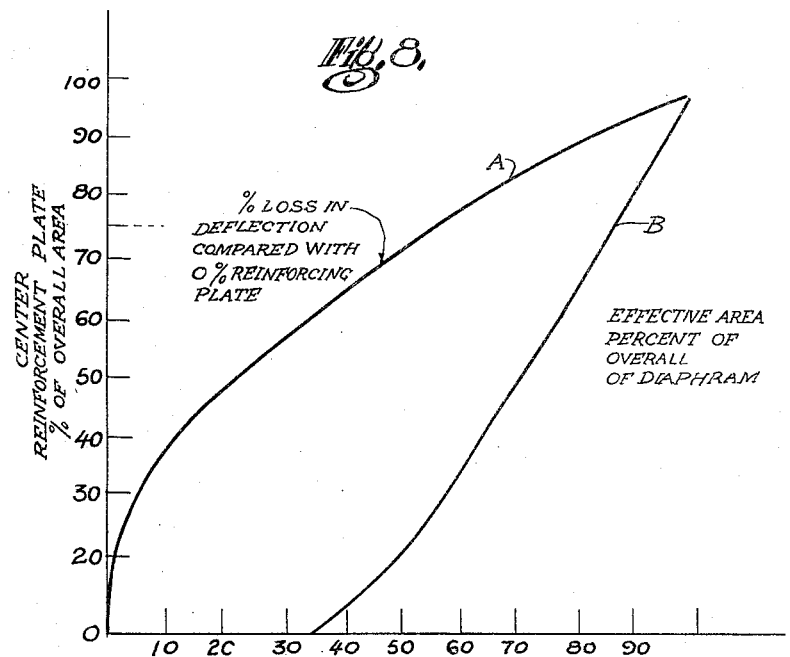
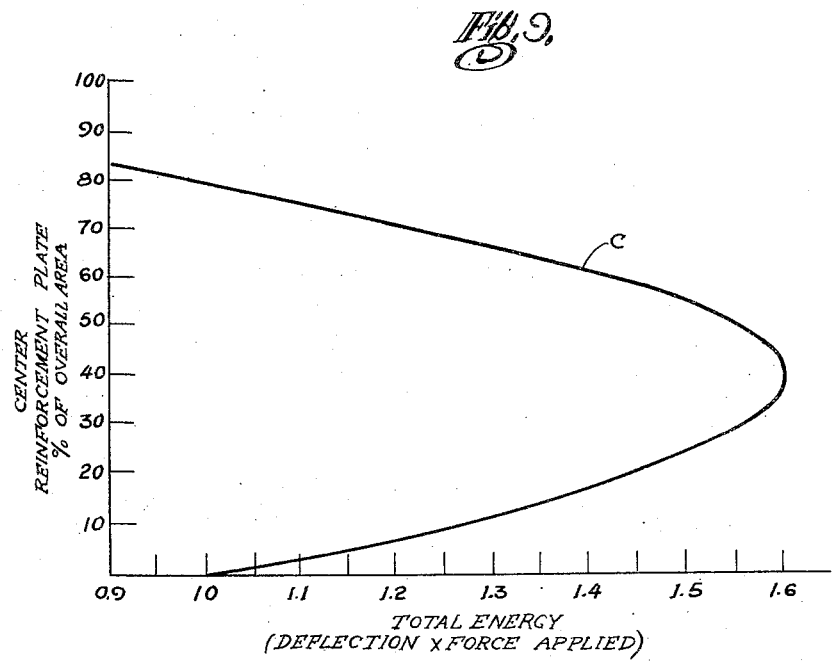

United States Patent Office 2,818,876
Patented Jan. 7, 1958

2,818,876

INSTRUMENTS

Ambrose E. Le Van, Hatfield, Pa., and William D. Huston, Rochester, N. Y., assignors to American Machine and Metals, Inc., New York, N. Y., a corporation of Delaware Application January 19, 1954, Serial No. 404,906

6 Claims. (Cl. 137—82)

This invention relates to instruments and parts thereof for controlling or indicating purposes and particularly to pressure relay devices for pneumatic relay operated arrangements and capsules therefor.

A measured variable, such as temperature, pressure, flow, or other changeable condition or measurement has been employed to operate a valve or flapper and nozzle combination relative to each other for the purpose of controlling an output air pressure proportional to the measured variable. As the valve or flapper is moved to closed position relative to the nozzle, the nozzle having air supplied thereto through a restriction, air pressure within the nozzle will rise and vice versa. In such an arrangement, a pressure relay or pilot operated by said nozzle pressure can be employed for the purpose of providing an output pressure proportional to the nozzle pressure, the output or transmitted pressure of the relay being useable to operate controller means, indicators, or recording means. One type of flapper or nozzle control device is described, for example, in copending application, Serial No. 391,049, filed November 9, 1953, now Patent No. 2,785,696, dated March 19, 1957.

Many of the previous air relays or pilots have been bulky and have not been sufficiently sensitive to provide the proper output or transmitted pressure in response to changes in the measured variable. Also, previous relays employing flexible metal diaphragms have not been entirely satisfactory or arranged so as to give the correct energy relations needed to operate properly. Non-metallic diaphragms are too sluggish and many have dead spots. The problem of providing a satisfactory relay is particularly difficult in the case of small instruments.

One of the objects of this invention is to provide an improved air relay having the desired energy and sensitivity characteristics.

Another object of the invention is to provide a compact air relay construction.

Another object is to provide a capsule arrangement having high sensitivity and having proper energy relations.

A further object of this invention is to provide an improved arrangement of parts in an air relay.

In a preferred form of the device, the relay may be composed of a pilot or input pressure wafer or capsule assembly connectable with the nozzle pressure of a measuring or condition responsive device, said capsule being arranged to contact a second or output capsule, said second capsule coacting with the main relay valve to admit or exhaust supply pressure in accordance with the pressure within the pilot pressure or input pressure capsule to the output pressure feed of the relay. For example, when the nozzle pressure is decreased, the arrangement is such that the valve connecting the supply pressure with the output pressure line will be closed or be moved toward closed position and a valve connecting the output pressure with atmosphere will be opened. This will reduce the pressure in the output connection.

The capsules preferably are composed of two diaphragms joined at their edges, each of the diaphragms having reinforcing plates of predetermined critical area relationship with the area of the capsule as will be explained hereafter. Preferably, the capsule has corrugations and is circular although it may have other appropriate configurations.

In a preferred form, the diaphragms may be made of metal with a low damping coefficient such as one consisting essentially of nickel, iron, chromium and titanium having precipitation hardenable characteristics with substantially constant spring qualities regardless of temperature. One such metal is that known as "Ni-Span-C."

These and other objects, advantages and features of the invention will become apparent from the following description, and drawings which are merely exemplary.

In the drawings:

Figure 1 is a top view of one form of the invention;

Figure 2 is a side view of Figure 1, an instrument case and measuring instrument with which the invention can be used being shown by dot-dash lines;

Figure 3 is a rear view of Figure 1;

Figure 4 is a view partially in section of the base of Figure 1;

Figure 5 is an enlarged view of the orifice restriction and cleaning plunger, looking in the general direction 5—5 of Figure 7;

Figure 6 is a diagrammatic sectional view of a relay employing the invention;

Figure 7 is an enlarged perspective view of a relay with parts broken away and in section;

Figure 8 is a graph showing relations between reinforcement plate area and loss in deflection, and reinforcement plate area and effective area;

Figure 9 is a graph showing the relation between reinforcement plate area and energy.

First, a complete relay will be described, reference being made to Figure 6. Air pressure may be supplied through pipe 20, to passage 21, in supporting base 22 of the relay generally indicated at 23. Orifice arrangement 24, details of which will be explained hereafter, permits a restricted amount of air to flow into pipe 25 and thence to a nozzle 26 of an instrument responsive to a measured variable. Pipe 25 also is connected to the interior of input capsule 27 through pipe 28. Flapper 29 is schematically shown, said flapper being controlled by the measured variable or condition to be determined.

Supply air also is fed to chamber 30 having a controlled passage 31 leading to the transmitted or output pressure chamber 32, chamber 32 being connected through passage 33A with the pipe 33B for feeding transmitted or control pressure to the desired point. Output pressure chamber 32 also is connected to the interior of output pressure capsule 33, said capsule having an exhaust aperture 34 therein controlled by valve 35 carried by valve plunger 37, aperture 34 being connected through passage 36 with the atmosphere. Supply pressure control valve 38 also is connected to plunger 37 and controls passage of air from chamber 30 through control passage 31 to output pressure chamber 32.

When flapper 29 tends to close nozzle 26, air will not escape as fast through the nozzle so that pressure will build up in pipe 28 and tend to expand capsule 27, thus moving valve plunger 37 upwardly to first close off aperture 34 and then to open passage 31 to permit air from the supply chamber 30 to flow to the output pipe 33B and thereby increase pressure therein. Because of the difference in size of area of input capsule 27 relative to output capsule 33, the output pressure will be amplified proportionally in the form shown. If pressure decreases in pipe 28, capsule 27 will tend to collapse and valve plunger 37 will cause valve 38 to close passage 31. If the travel is sufficiently great, aperture 34 will be opened to exhaust pressure from line 33B through aperture 34 and pipe 36 to the atmosphere and thereby reduce the output pressure.

An instrument of the type involved herein requires a certain amount of power to operate properly so that friction, backlash, inertia, etc., will not disturb or introduce a significant error therein. Also, certain size limitations are present. It has been particularly difficult to utilize metal diaphragms in instruments where the capsule enters into the operation, especially where there is a coaction between two separate devices or capsules as in a pressure relay.

In a capsule or wafer arrangement, especially useful in a device of the category described herein, it has been found that decidedly improved results will be obtained if a reinforcing plate of critical size relationship is put on or fastened to at least one of the diaphragm plates of the capsule. As discussed hereafter, the reinforcement plate area is made a predetermined critical range relative to the area of the capsule or wafer itself. By making the relationship of areas within said predetermined range, the energy available upon change in pressure in the capsule can be increased over that of an unreinforced plate so that said increase of energy will be a predetermined amount over the energy available of an unreinforced capsule arrangement. By making it between about 18% and 62% of the projected diaphragm area, the energy available will be over 1.4 times the energy available of an unreinforced diaphragm. As the reinforcing plate is increased in size, the deflection will decrease for a given change, but the effective area will increase. The energy available is indicated by the product of deflection times force applied, as will appear hereafter.

In Figure 8, curve A shows the loss in deflection compared with the maximum deflection available with an unreinforced diaphragm, as the center reinforcing plate area is increased in size relative to the over-all area. Curve B shows the effective area increase as the reinforcement plate area is increased. The effective area relationship is determined by loading the capsule with a dead weight and measuring the pressure required to support the weight, such being compared with an unreinforced capsule. The factor "available energy" is obtained from the product of deflection times force applied. Thus, it is apparent that when the diaphragm of the wafer has no reinforcing plate thereon, maximum deflection will occur but the effective area or weight supportable at a given pressure will be the least.

It also has been ascertained that it is desirable to have substantially constant effective area irrespective of the particular pressure involved. This is particularly true in instruments where pressures are balanced against each other in a plurality of capsules as is the case with an air relay. It has been found that when the reinforcing plate is above about 20% of the projected area of the capsule there is substantially no change in effective area with a change in internal pressure, whereas below such a size there is a non-linearity.

As will be apparent from Fig. 9, when the reinforcing plate area is made between 18% and 62% of the projected area of the capsule, the total or available energy will be slightly above 1.4 times that of an unreinforced capsule, reaching a maximum of approximately 1.6. If the reinforcing plate area relationship be kept within these limits, it has been found that such will markedly improve operation of a capsule, especially in an air pressure relay of the type involved herein.

The diaphragm plates of the capsule preferably have corrugations which may be concentric, the reinforcing plate being approximately at the center. The reinforcing plates also can have studs for attachment to the instrument. The reinforcing plates may be soldered or brazed to their diaphragm plates.

The air relay device of the present invention in one of its forms can be mounted on a relay base which can be incorporated into a compact air transmitter or controller instrument, the relay base being made the base upon which the remainder of the instrument is mounted. As schematically illustrated in Figure 2, casing 39 is indicated as carrying a flapper and nozzle instrument 40, said combination being connected to the pressure relay arrangement shown generally at 41 mounted on the relay base 42. As an example, a complete instrument can have dimensions in the range of 3¾" wide by 4¾" high and 4" deep. As previously mentioned, a preferred metal for the capsule diaphragm plates is one consisting essentially of nickel, iron, chromium and titanium. The preferred composition is 41–43% nickel, 2.2–2.6% titanium, 5.1–5.7% chromium, maximum carbon .06%, manganese 0.3–0.6%, silver 0.3–0.6%, aluminum 0.4–0.8%.

Referring to Figure 7. base 42 may have columns 51 mounted thereon supporting a plate 52, said plate having an aperture 53A in which is mounted nut 54, nut 54 adjustably carrying stud 53. Motion limiting means 53B may be mounted in said stud. Stud 53 has a reinforcing plate or enlarged portion 55 which is fastened to the diaphragm, said enlarged portion 55 being properly related to the diameter of the pilot pressure capsule 57, as explained heretofore.

The opposite side of said input pressure capsule 57 has a reinforcing plate 58 thereon, said plate being engageable with the relay valve 59 fastened to output pressure capsule 61. The relay valve 59 has valve seat passage 62 extending therethrough cooperating with valve 69 of valve plunger 63. Transverse passage 64 provides a path from valve passage 62 to the atmosphere.

The diameter or area of plate 60 where it contacts capsule 61 is properly related to the projected diameter or area of the capsule 61 onto a plane substantially parallel to the plane through the joined edges of the capsule to give proper energy relationships as described previously.

On the opposite side of capsule 61, stud 65 has a surface 66 related to the diameter of capsule 61 to give proper energy relationships as previously mentioned. The stud 65 is screw-threadedly engaged at 67 to base 42. Output pressure chamber 68 has the valve plunger or stem 63 extending therethrough. Valve stem 63 has a conical valve 69 at its end cooperating with valve passage 62 for controlling passage of air from output pressure chamber 68 to the atmosphere through passage 62 and passage 64.

Output pressure chamber 63 also has a passage 70 controlled by valve 71 for admitting supply air from the supply chamber 72 to output pressure chamber 68.

Supply air is admitted through supply pipe 73, passage 74, chamber 76, and passage 77.

When valve element 71 is raised relative to aperture 70, supply air will be furnished to the output pressure chamber 68 and through passage 78 to the transmitted pressure line 79. Opening 78A may have plug 78B closing the same.

Spring 80 may be in the form of an X having its ends 81, 81 projecting through apertures 82, 82 in plate 52, the spring being fastened to stud 55 so as to prevent turning thereof when adjusting nut 54 is turned. Pipe 83 mounted in aperture 83A in base 42 can be connected to the supply gauge, such as a gauge 84 (Fig. 3). The orifice holder and plunger cleaning arrangement, generally indicated at 85, are illustrated in detail in the enlarged view of Fig. 5.

Supply pressure from chamber 76 is fed through apertures 86 in the plunger housing 87 to the orifice 91. Plunger 88 carries orifice cleaner 89, spring 90 urging the plunger and cleaner 89 into an inoperative position. Removable orifice 91 may be made from a jewel or the like, the orifice being selected so as to provide the proper restriction from chamber 76 to chamber 92, which is connected to pipe 93 leading to a suitable nozzle and flapper arrangement such as illustrated in Fig. 6. Input pressure is fed to the interior of capsule 57 through passage 94.

The operation is similar to that described for Fig. 6 wherein upon increase of input pressure, capsule 57 will expand so as to tend to collapse output pressure capsule 61. This will serve to close valve passage 62, and when movement is sufficiently great, valve passage 70 will open because of movement of valve plunger 63. Thus, supply pressure will be furnished from supply feed 73, passage 74, chamber 76, passage 77, chamber 72, passage 70, transmitted pressure passage 78, to transmitted pressure 79. Upon decrease in input pressure, capsule 57 will tend to collapse and pressure in capsule 61 will cause it to extend spring 63A urging the stem 63 to a valve closing position to close passage 70 and eventually open passage 62 to exhaust air from the transmitted pressure chamber 68 and pipe 79.

The details of base 42 are illustrated in Fig. 4 showing the valve passages, numerals corresponding with those of Fig. 7. Fig. 3 shows the outside of base 42 with the various pipe connections thereto. It is to be noted that access to the valve plunger assembly 63 is furnished through the plug 95.

The relay assembly is seen to include a base having the various parts mounted thereon, including the restriction for the nozzle and flapper arrangement, said restriction having a cleaning means which is accessible from the exterior of the instrument. The base may take other forms and also may be used in an air relay assembly without the measuring instrument arrangement illustrated in Fig. 2.

It should be apparent that variations may be made in the details of construction without departing from the spirit of the invention except as defined in the appended claims.

What is claimed is:

1. In a pressure responsive device, the combination including a flexible metal diaphragm sealed around its edge with another body to form a chamber, said metal being a precipitation hardening alloy consisting essentially of nickel in the range of 41 to 43%, chromium in the range of 5.1 to 5.7%, titanium in the range of 2.2 to 2.6%, and iron, centrally located relatively stiff reinforcing plate means fastened to said diaphragm, said plate means having an area not less than 18% of nor more than 62% of the projected diaphragm area so that the energy available will be above 1.4 times the energy available of an unreinforced diaphragm.

2. In a pressure responsive device, the combination including a pair of flexible metal diaphragms joined around their outer edges to form a capsule, each of said diaphragms having concentric corrugations therein, centrally located relatively stiff reinforcing plates fastened on each of said diaphragms within the corrugation of least diameter, each of said plates having an area not less than 18% of and not more than 62% of the projected area of said capsule so that the energy available by operation of said capsule will be above 1.4 times the energy of an unreinforced diaphragm capsule.

3. In a pressure responsive fluid relay apparatus, the combination including a pair of flexible metal diaphragms bonded adjacent their peripheries to form an expandible and contractable capsule when force is exerted thereon, said metal being a precipitation hardening alloy consisting essentially of nickel in the range of 41 to 43%, chromium in the range of 5.1 to 5.7%, titanium in the range of 2.2 to 2.6%, and iron, reinforcing relatively flat plate means joined to a central portion of each of said diaphragms, the diameter of said plates being related to the diameter of said diaphragms so that the area of the plates is not less than about 18% of nor more than about 62% of the projected area of said capsule so that the total energy available upon exerting a force on said capsule will be above 1.4 times the energy of an unreinforced diaphragm capsule, and means attached to one of said plates for positioning said capsule relative to said relay apparatus.

4. In a pressure responsive fluid relay apparatus, the combination including a pair of capsules operatively connected with each other, each of said capsules comprising a pair of flexible metal diaphragms joined around their outer edges to form a first and second capsule, each of said diaphragms having corrugations and having centrally located relatively stiff reinforcing plate means fastened thereto on the relatively flat area within the smallest diameter corrugation, at least one of said plate means for each capsule having an area related to the area of its capsule so as to be not less than about 18% nor more than about 62% of the projected area of its capsule so that the energy available upon operation of said capsule will be above 1.4 times that of an unreinforced capsule, means feeding an input pressure to the interior of said first capsule, movement of said first capsule upon change of input pressure moving the second capsule, supply pressure source means, supply pressure valve means operated by said second capsule and movable thereby in response to movement thereof by the first capsule, said supply pressure valve means controlling the supply pressure source means to the second capsule and also to an output pressure feed pipe, and an exhaust valve means mounted on said second capsule controlling passage of air from the interior of the second capsule to the exterior thereof.

5. In a unitary pressure responsive fluid relay, the combination including a main base upon which is mounted an output pressure capsule, said capsule having an exhaust aperture on one wall thereof, an input pressure capsule, a plate mounted on supporting members spacing the plate from said main base and between which said capsules are maintained in assembled alignment, an adjusting nut on said plate upon which said input pressure capsule is carried, supply and exhaust pressure valve means located in and operated by movement of said output capsule, said main base having supply pressure connection means and a supply passage leading therefrom to a valve chamber controlled by said valve means, centrally located relatively stiff reinforcing plates on each of said diaphragms, each of said plates having an area not less than 18% of and not more than 62% of the projected area of said capsule so that the energy available by operation of said capsule will be above 1.4 times the energy of an unreinforced diaphragm capsule, a measured variable pressure passage in said base connected to said supply passage through an orifice, one of said reinforcing plates being attached to a post cooperating with said adjusting nut, orifice cleaning means mounted on said base and having a reciprocable plunger for cleaning said orifice, and a controlled pressure passage in said base connected to said output pressure capsule.

6. In a unitary pressure responsive fluid output pressure control arrangement, the combination including a main base upon which is mounted an output pressure capsule, said capsule having an exhaust aperture on one wall thereof, an input pressure capsule, a plate having supporting members spacing the same from said main base, said capsules being maintained in assembled alignment between said main base and plate, supply and exhaust pressure valve means located in and operated by movement of said output capsule, said main base having supply pressure connection means and a supply passage leading therefrom to a valve chamber controlled by said valve means, centrally located relatively stiff reinforcing plates on each of said diaphragms, each of said plates having an area not less than 18% of and not more than 62% of the projected area of said capsule so that the energy available by operation of said capsule will be above 1.4 times the energy of an unreinforced diaphragm capsule, a measured variable pressure passage in said base connected to said supply passage through an orifice, orifice cleaning means mounted on said base and having a reciprocable plunger for cleaning said orifice, a controlled pressure passage in said base connected to said output pressure capsule, a flapper and nozzle measuring instrument having means operating said flapper and nozzle relative to each other, supporting posts mounted on said base carrying said measuring instrument, piping means connecting said flapper and nozzle measuring instrument with said measured variable pressure passage, and a sleeve casing slidably engageable with said base within which said capsules and said measuring instrument are carried, said cleaning means being accessible from the exterior of the assembly.

References Cited in the file of this patent

UNITED STATES PATENTS

| | | |
|---|---|---|
| 468,129 | Cumberbatch | Feb. 2, 1892 |
| 1,508,983 | Miller | Sept. 16, 1924 |
| 2,061,794 | Deming | Nov. 24, 1936 |
| 2,073,838 | Hammond et al. | Mar. 16, 1937 |
| 2,235,110 | Ottley | Mar. 18, 1941 |
| 2,302,014 | Fausek | Nov. 17, 1942 |
| 2,405,979 | Rosenberger | Aug. 20, 1946 |
| 2,461,026 | Bilyeu | Feb. 8, 1949 |
| 2,631,570 | Bowditch | Mar. 17, 1953 |
| 2,635,640 | Nellis | Apr. 21, 1953 |
| 2,659,381 | Seljos | Nov. 17, 1953 |

FOREIGN PATENTS

| | | |
|---|---|---|
| 880,044 | France | Dec. 10, 1942 |